March 26, 1929.  P. RAIMER ET AL  1,706,742
TRACTOR ATTACHMENT
Filed Oct. 27, 1923  4 Sheets-Sheet 1

INVENTORS
Philip Raimer
Edward A. Rolfs
BY Barts & Macklin
ATTYS.

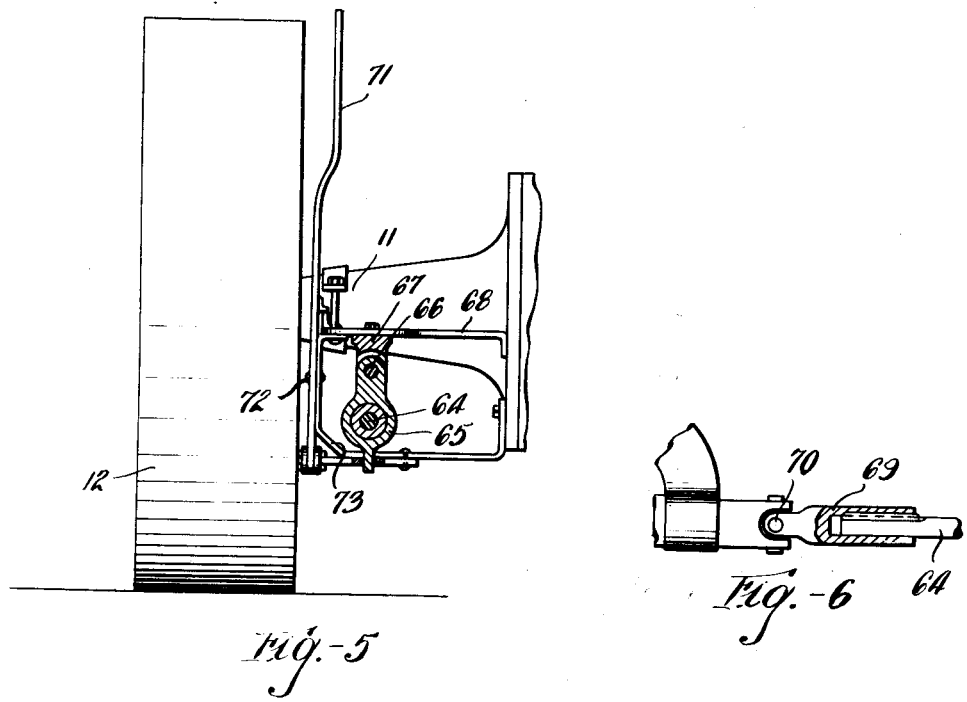
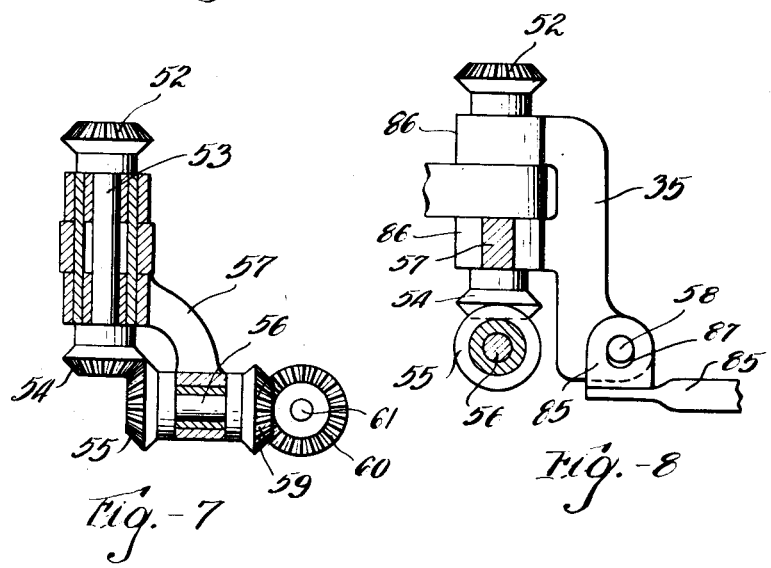

Patented Mar. 26, 1929.

1,706,742

UNITED STATES PATENT OFFICE.

PHILIP RAIMER AND EDWARD A. ROLFS, OF MAPLE HEIGHTS, OHIO; SAID ROLFS ASSIGNOR TO SAID RAIMER.

TRACTOR ATTACHMENT.

Application filed October 27, 1923. Serial No. 671,147.

This invention relates to operating means for tractor trailers such as are adapted for use in large grading and excavating projects.

Tractor trailers embodying road scrapers have heretofore been used, particularly those of the dumping type, but the principal objection to the use of such scrapers is the fact that two men, in addition to the tractor driver, are required to actuate the scraper; one at the loading point and another at the unloading point. Moreover, a disadvantage of such scrapers is the difficulty of filling a partially loaded scraper without tipping it, in case the scraper becomes sufficiently imbedded in the ground to prevent forward travel of the tractor. In such instances, the practice heretofore has been to dump the scraper and to retrace the path for another load.

One of the objects of our invention is the provision of means for enabling a scraper of the dumping type to be effectively operated by the tractor driver, both for loading and unloading purposes, thus obviating the necessity for an additional working crew.

A further object of our invention is the provision of an operating mechanism between the tractor and trailer, which permits the size of a load to be accurately controlled by the tractor operator and enables the unloading operation to be performed in like manner.

A still further object is the provision of a simple yet rugged mechanism, which may be readily attached to existing tractors without necessitating extensive changes or modifications in the construction thereof, yet which is so arranged that the tractor may be operated over rough and uneven ground, without tipping the trailer and thereby causing the contents of the scraper to be prematurely unloaded.

The means for carrying out the above objects will hereinafter be fully set forth in the following description which pertains to the accompanying drawings. The essential characteristics of our invention will be summarized in the claims.

Figure 1:
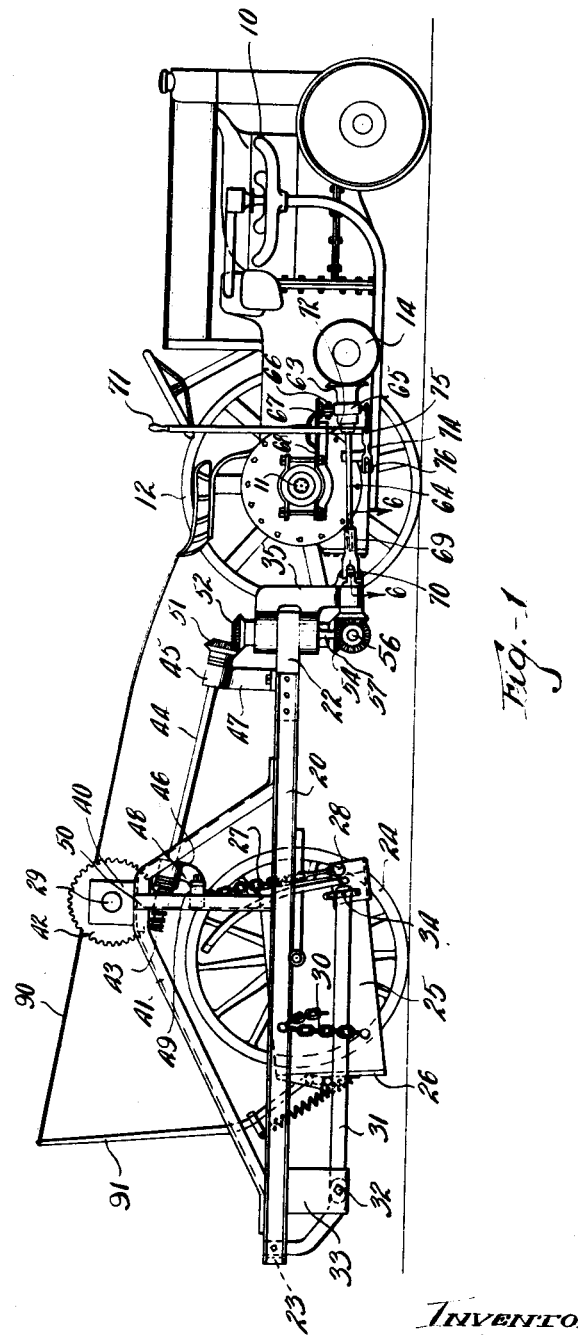
Figure 2:
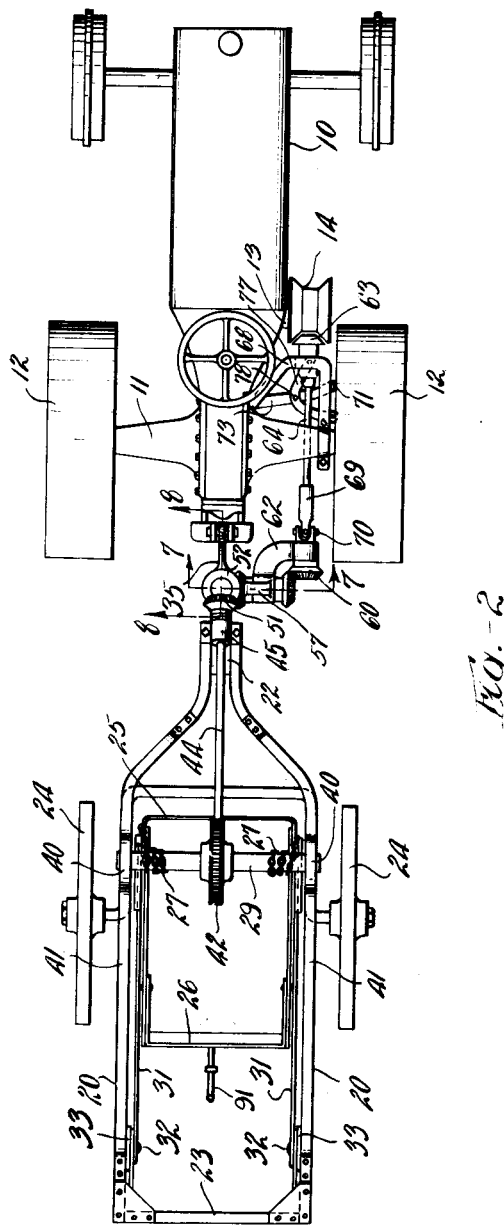
Figure 3:
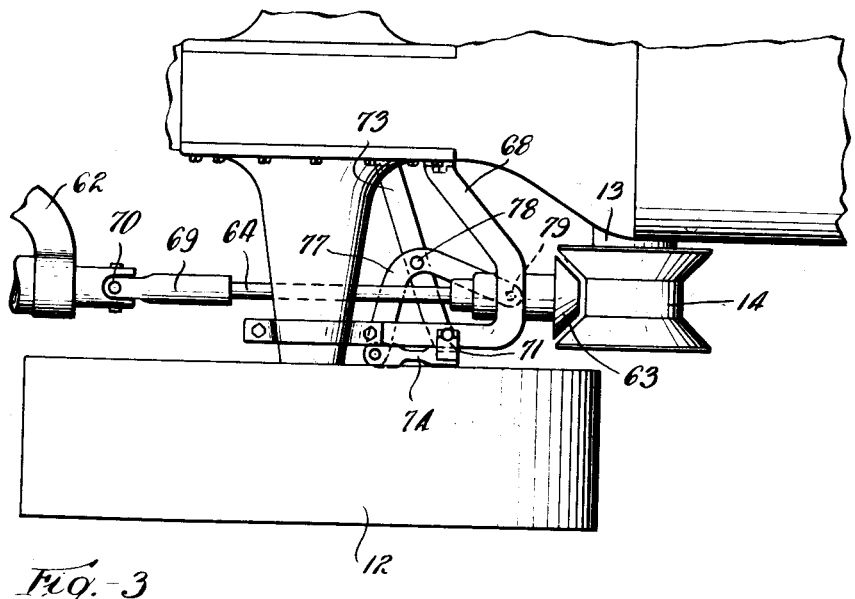
Figure 4:
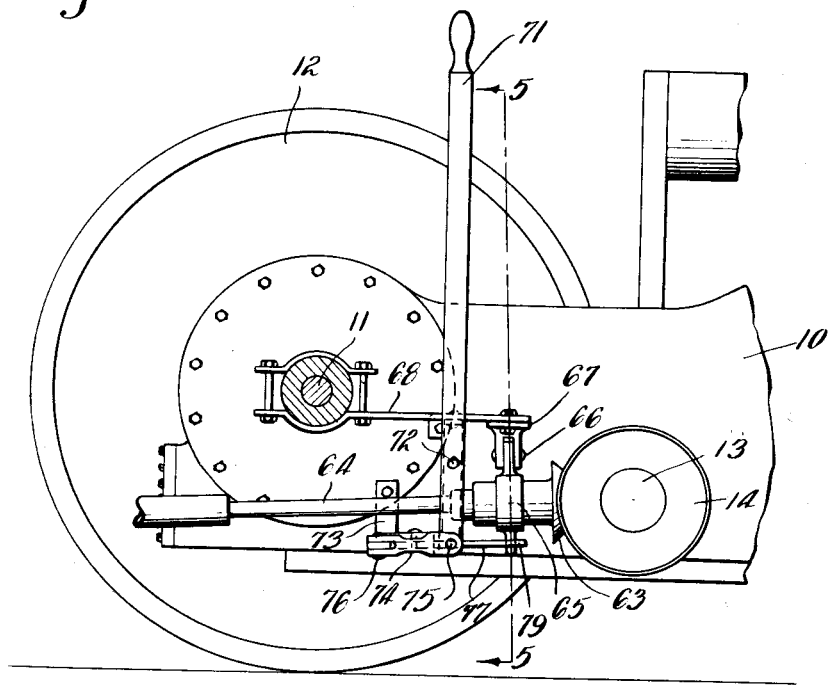

In the drawings, Fig. 1 shows a section through the rear axle and housing of a tractor vehicle having mechanism embodying our invention operatively connected to the tractor; Fig. 2 is a plan view of a tractor and trailer with the mechanism connecting them made in accordance with our invention; Fig. 3 is a plan view showing a portion of the tractor and illustrating the control mechanism for the trailer; Fig. 4 is a section through the rear axle and housing of the tractor and illustrating a portion of the control mechanism in elevation; Fig. 5 is a section taken on the line 5—5 in Fig. 4; Fig. 6 is a section taken on the line 6—6 in Fig. 1; while Figs. 7 and 8 are sections taken on the correspondingly numbered lines in Fig. 2.

We have illustrated our invention in connection with a tractor having a power plant indicated generally at 10, a drive shaft 11 and drive wheels 12. This tractor is also shown as having an auxilliary power shaft 13, which may be operable independently of the drive shaft 11, and which is conveniently located adjacent the driver's seat. A power wheel 14 is rigidly mounted on the shaft 13.

The trailer drawn by the tractor is illustrated as comprising a frame having side-bars 20 which preferably converge at the forward end thereof, and are connected by means of an interposed member 22. The rearward ends of the bars may be joined by a transverse beam 23. The frame is suitably supported by wheels 24 as shown in Figs. 1 and 2.

The implement carried by the trailer is illustrated as a scraper having a ground engaging pan 25 and a gate 26 adjacent the rearward end thereof. The forward end of the pan is arranged to be adjustably supported and to this end we employ chains 27, the lower ends of which are connected as at 28 to the pan and the upper ends of which extend over and are connected to a winding member, or shaft 29. The rearward end of the pan is illustrated as being supported by an adjustable chain 30 which extends between the pan and the side bars of the frame. Pusher bars 31 are shown as having the rearward ends thereof pivotally connected at 32 to plates 33 which depend from the bars 20 and as having the forward ends thereof pivotally connected, as at 34, to the sides of the pan.

To raise and lower the cutting edge of the pan 25, we provide operating mechanism actuated by the power shaft 13 for raising and lowering the chains 27 as desired. In the preferred form this mechanism embodies a shaft 29 journaled in bearings 40 which are supported on a truss 41 carried by the side bars 20. The shaft 29 also carries a worm wheel 42 which may be driven by a worm 43 on a shaft 44. This shaft is indicated as being supported at one end by a bearing 45 on a bracket 47, and at the other end by a bearing 46 on a bracket 48. The last named bracket may be carried by a cross-bar 49 which extends transversely of the frame and between the vertically disposed truss members 50.

The shaft 44 may be rotated by a gear 51 which meshes with a gear 52. As shown in Fig. 7, this last mentioned gear is carried on the upper end of a shaft 53, the axis of which forms a pivot about which the trailer moves in a horizontal plane with relation to the tractor. The lower end of the shaft 53 is shown as having a gear 54 thereon which meshes with a companion gear 55 on a lay shaft 56. The shaft 56 is supported in an arm 57 which is integral with a bracket 35. This bracket is pivotally connected at 58 to the rear of the tractor.

To rotate the shaft 56, I have shown a gear 59 which meshes with a companion gear 60 on a shaft 61. This shaft is journaled at one end thereof in an arm 62, which is shown as being integral with the bracket 35. The shaft 61 may be rotated by a clutch member 63 which is supported on a shaft 64 and is arranged to be selectively brought into engagement with the conical faces of the pulley wheel 14.

The shaft 64 preferably has the forward ends thereof journaled in a yoke 65 which is pivotally mounted at 66 in a bracket 67. This bracket is shown as being rigidly connected to the tractor rear axle housing by a strap 68. The rearward end of the shaft 64, as shown in Fig. 6 is splined to a hollow member 69 which forms part of a universal joint indicated in general at 70.

The pivotal mounting of the yoke 65 permits the member 63 to be shifted laterally for engaging either of the opposed conical faces on the wheel 14. To effect such lateral selective motion of the member 63, I prefer to employ a shipper lever 71 which is pivotally mounted at 72 on a bracket 73, and which is also rigidly connected to the rear axle housing. To connect the shipper lever to the yoke 65, I have shown a link 74, one end of which is pivotally connected as at 75 to the lever and the other end of which is pivotally connected at 76 to a bell-crank 77. This bell crank may be pivotally mounted at 78 to a portion of the bracket 73, while the free end thereof is operatively connected at 79 to the yoke.

When the shipper lever is in the position shown in the drawings, then the clutch member 63 is out of engagement with the power wheel 14, wherefore the pan 25 is held against lowering by the worm and worm wheel connection which provides an effective lock against rotation of the shaft 29. When the lever 71 is shifted forwardly then the member 63 is brought into engagement with one of the conical faces on the wheel 14, wherefore the shaft 29 is rotated in one direction, while if the lever is shifted rearwardly, the member 63 is brought into engagement with the opposed conical face of the wheel whereupon the shaft is rotated in the opposite direction.

To permit movement of the tractor and trailer over uneven ground without dumping the contents of the pan, I have shown a member 35 which, as heretofore stated, is pivoted at 58 to a bracket 85 which is carried by the tractor. This permits movement of the trailer in a vertical plane with relation to the tractor.

Horizontal movement of the tractor with relation to the trailer may be permitted by the connection between the member 22 and the arms 86 which are shown as being integral with the member 35. To permit a slight inclination or twist of the tractor with relation to the trailer, as for instance when one side of the tractor is lower than the other side, we may employ a loose connection between the pin 58 and the bearing therefor in the bracket 85. This is indicated by elongated openings 87 in the arms of the bracket as shown in Fig. 8. To compensate for movement of the trailer with relation to the tractor, we have illustrated, as heretofore described, a sliding connection between the shaft 64 and the member 69. Thus the trailer may have substantially universal movement with relation to the tractor without interfering with the normal operation of the connecting mechanism.

To operate a scraper which is arranged to be actuated by our invention, the lever 71 is shifted to engage the clutch in such manner as to effect a lowering of the chains 27 which support the forward end of the pan. The weight of the pan causes it to move about the pivotal connection 32 of the pusher rods while the adjustment of the supporting chains 30 causes the forward end of the pan to engage the ground. The depth of cut may then be controlled while the tractor is moving in accordance with the length of chain payed out upon rotation of the shaft 29. As soon as the pan is loaded, then the lever 71 is shifted in the opposite direction so as to reverse the direction of rotation of the shaft 29 and thereby to wind in the forward supporting chains. This raises the cutting edge of the pan and retains the accumulated load until the tractor is removed to the unloading location. Thereupon, the operator pulls a cord 90 which is attached to the upper end of a trip lever 91 and thus releases a gate 26, wherefore the contents of the pan may be unloaded. The inclination of the pan with relation to the trailer frame determines the degree of unloading. For instance if the bottom of the pan is inclined slightly to the horizontal then the unloading may be spread over a comparatively large area, while if the bottom of the pan is inclined considerably to the horizontal, then the contents are discharged rapidly within a small area. When the forward edge of the pan is again lowered, then the gate 26 is automatically locked in the usual manner.

In view of the foregoing description, it will be understood that we have provided a simple and rugged mechanism for effecting selective operation of an implement mounted on a tractor trailer. This is advantageous particularly when used in connection with a scraper in that the necessity for an additional operating crew of two men is obviated. Moreover our invention permits the adaptation of the connecting mechanism between the tractor and trailer to existing tractors without necessitating material changes in the construction thereof.

We claim:

1. In a device of the character described, the combination with a tractor, of a trailer, controlling means upon the tractor, operating means upon the trailer, means providing two pivotal connections between the tractor and trailer at the mid portion of the tractor, and mechanism including a shaft extending through one of the pivotal connections for actuating said operating means.

2. In a device of the character described, the combination with a tractor, of a trailer, operating means upon the trailer, controlling means upon the tractor, a universal joint at the mid portion of the tractor and between the trailer and tractor including two pivotal connections disposed at right angles to each other, and operating mechanism including a shaft extending through one of the pivotal connections for connecting the controlling means with the operating means.

3. In a device of the character described, the combination with a tractor, of a trailer, operating means on the trailer, controlling means on the tractor, a single member disposed intermediate the tractor and trailer and providing a pivotal connection in two directions therebetween, mechanism extending through one of the pivotal connections for operativey connecting the controlling means with the operating means, said mechanism including a shaft which comprises one of the pivots.

4. In combination, a tractor having a transversely extending power shaft in advance of the rear axle of the tractor, a shaft adapted to be connected thereto and extending rearwardly beneath the rear axle, a trailer having a winding drum thereon, said trailer having a universal connection with the tractor, a shaft carried by the trailer and operatively connected to the winding drum, and means passing through the universal connection for operatively connecting said shafts.

5. In a device of the character described, the combination with a tractor, of a trailer, operating means on the trailer, controlling means on the tractor, a single member hinged at separated points to the tractor and trailer respectively, a shaft extending through one of the hinge connections for operatively connecting the controlling with the operating means, and a self locking gear connection between said shaft and said operating means.

6. In a device of the character described, the combination with a tractor, of a trailer, a winding member on the trailer, a member pivotally mounted to swing in one direction with reference to the trailer, and also pivotally mounted to swing in another direction with reference to the tractor, a shaft comprising one of the pivotal connections, gearing connecting the shaft with the winding member, power means on the tractor including a driving wheel, a clutch member shiftable laterally for selectively engaging said wheel, and gearing including a universal joint connecting the clutch member with said shaft.

7. In a device of the character described, the combination with a tractor, of a trailer, a member mounted on the tractor so as to swing in a vertical plane with reference thereto, means connecting the member with the trailer so as to permit the trailer to swing in a horizontal plane with reference to the tractor, said means including a shaft, a power wheel on said tractor, a pivoted clutch member adapted to engage said wheel, a bell crank having one end thereof arranged to shift the clutch member, a shipper lever operatively connected to the opposite end of the bell crank, gearing connecting the clutch member to the pivot shaft, a winding drum on the trailer, and gearing connecting the pivot shaft to the winding drum.

8. In a device of the character described, the combination with a tractor, of a trailer, a winding drum journalled on the trailer and extending transversely thereof, a shaft carried by the trailer, a worm and worm wheel connection between the shaft and drum, a universal joint between the tractor and trailer, operating means on said tractor, and mechanism including a shaft extending through the universal joint for operatively connecting said means with said trailer shaft.

9. In a device of the character described, the combination with a tractor, of a trailer, a member pivotally connected to the tractor and to the trailer respectively at separated points, said pivotal connections being so disposed with reference to each other that the trailer may move either in a horizontal or vertical plane with reference to the tractor, one of said pivots having a loose connection whereby the tractor may be twisted with reference to the trailer.

10. In a device of the character described, the combination with a tractor, of a trailer, a bracket pivoted to the tractor and having a pair of arms associated therewith, said trailer extending between said arms, a shaft projecting through the arms and through the trailer and providing a hinged connection between the bracket and trailer, a winding drum on the trailer, gearing connecting one end of said shaft with the winding drum, a lay shaft extending transversely of the tractor and supported by said bracket, gearing connecting the lay shaft with the first mentioned shaft, a driving shaft extending longitudinally of the tractor and also supported by said bracket, gearing connecting the lay shaft with the driving shaft, and controlling means for selectively operating the driving shaft from the tractor.

11. In a device of the character described the combination with a tractor, of a trailer, a bracket pivoted on the tractor so as to move in a vertical plane with reference thereto, means for pivotally connecting the bracket to the trailer whereby the trailer may be moved in a horizontal plane with reference to the tractor, a shaft extending through one of the pivotal connections, a winding drum on the trailer, gearing connecting one end of the shaft with said winding drum, operating means on the tractor, and mechanism connecting the controlling means with the other end of the said shaft, said mechanism including a universal joint which is disposed substantially in horizontal alignment with the pivotal connection between the bracket and the tractor.

In testimony whereof, we hereunto affix our signatures.

PHILIP RAIMER.
EDWARD A. ROLFS.